E. F. COLLINS.
CONTROL FOR ELECTRIC FURNACES AND THE LIKE.
APPLICATION FILED NOV. 14, 1918.
1,391,996.
Patented Sept. 27, 1921.
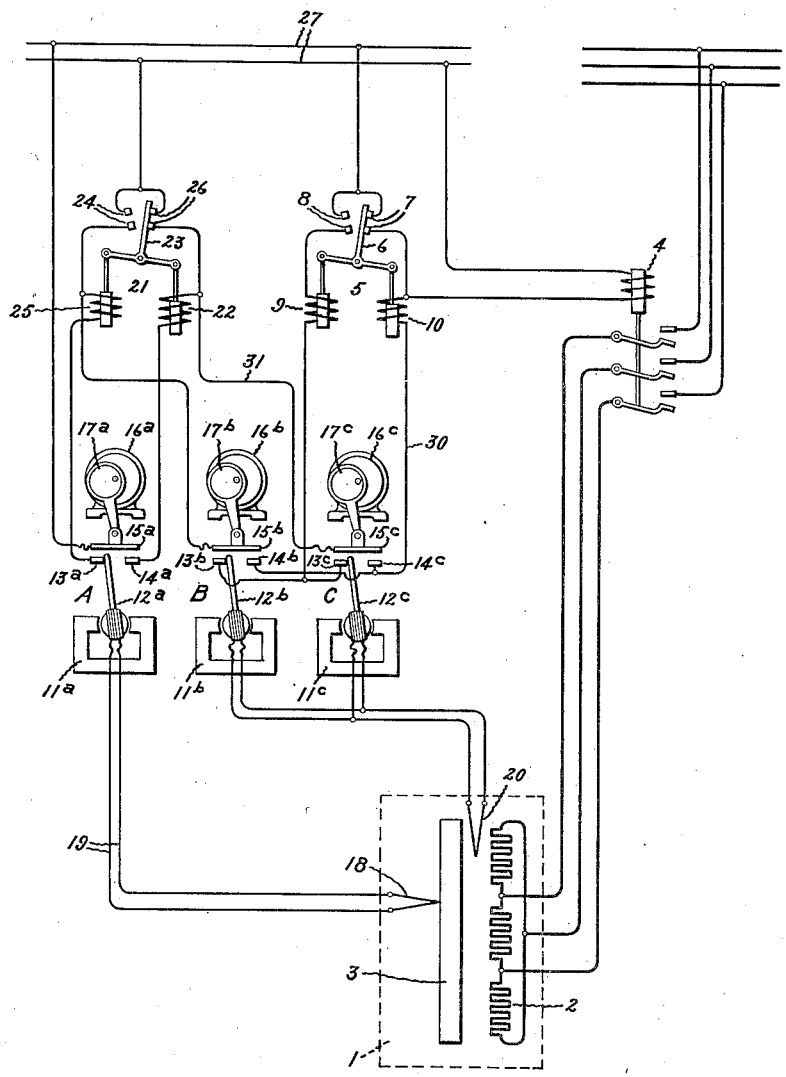
Inventor:
Edgar F. Collins,
by
His Attorney.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

CONTROL FOR ELECTRIC FURNACES AND THE LIKE.

1,391,996.   Specification of Letters Patent.   Patented Sept. 27, 1921.

Application filed November 14, 1918. Serial No. 262,458.

*To all whom it may concern:*

Be it known that I, EDGAR F. COLLINS, a citizen of the United States, residing at Schenectady, in the county of Schenectady, State of New York, have invented certain new and useful Improvements in Controls for Electric Furnaces and the like, of which the following is a specification.

My invention relates to temperature control for electrically heated apparatus, such as electric furnaces and the like, and has for its object the provision of means whereby a predetermined temperature may be reached and thereafter automatically maintained in a reliable, simple and efficient manner.

While my invention may be employed generally in connection with electrically heated apparatus, it is particularly useful in connection with electric furnaces where the charge must be maintained at a definite temperature. In the case, for instance, of an electric furnace for heat treating steel blocks, shafts, guns, etc., the working temperature after being reached, should be maintained within relatively narrow limits. In order to reach the temperature quickly a high input should be employed in the furnace until the charge reaches the prescribed temperature after which the input may be lowered to such a point as to merely compensate for the heat losses. In order to accomplish this, it is necessary to operate the heating element or resistor for a time at a relatively high temperature while at the same time protecting it from excessive temperature. This may involve a thermostat control for maintaining the temperature at approximately this high temperature. When the predetermined temperature of the charge is reached, however, it is no longer necessary or desirable to maintain the high temperature of the resistor, and a second thermostat control to maintain the resistor at a lower temperature may be used.

In carrying out my invention I control the change from the high temperature control of the resistor to the lower temperature control by the temperature of the furnace charge. To accomplish this result I employ a thermostat control associated with the charge in addition to the thermostat apparatus controlling the temperature of the resistor. In one embodiment of my invention I provide means whereby when the charge reaches a predetermined temperature, the thermostat control of the resistor is automatically shifted from the one control which maintains the high temperature, to another which maintains a lower temperature. It is understood, of course, that the temperature of the resistor is somewhat higher than that of the charge but is considerably above this temperature when it is at its maximum for heating up the charge. In a case, for instance, where the temperature of the charge is to be maintained at 1500° F., the temperature of the resistor may at first be as high as 1800° F. until the charge is heated up and thereafter the temperature of the resistor may be reduced to 1540°. Assuming these temperatures for purposes of illustration, when the electric furnace is started or newly charged the thermostat control will maintain a temperature at the resistor of approximately 1800° F. When the charge, however, becomes heated to a temperature of approximately 1500° F., the temperature control of the resistor is automatically shifted to the one which will maintain a temperature of 1540° on the resistor unless the charge temperature falls below 1500° F. If the temperature of the charge falls below 1500° F., the temperature control of the resistor is automatically shifted to the one which maintains a temperature of 1800° F., which will again increase the temperature of the charge. When the charge again reaches 1500° F., the temperature control is again shifted to the one which maintains a temperature of 1540° F., and this cycle continues until the charge temperature ceases to fall at which time the charge is heated through. The temperature of the resistor is then maintained at 1540° F., it having been gradually reduced to this temperature by a series of steps in accordance with the cycles above described.

In the accompanying drawing illustrating my invention diagrammatically, an electric furnace is indicated by a dotted outline 1 in which is located a heating element or resistor 2 and the charge to be heated 3. The current supplied to the resistor is controlled by an electromagnetic switch or contactor 4, the circuit of which is controlled by a relay 5. This relay has two positions, in one of which its contact arm 6 bridges contacts 7 to energize the winding of the contactor 4, while in the other position the contact arm bridges the contacts 8 for a purpose which will hereinafter appear. The contact arm is moved into engagement with the contact 7 by the energization of the winding 9 and is moved to the opposite position into engagement with the contacts 8 by the energization of the winding 10.

The operation of the relay 5 is controlled by three thermostat devices which I shall designate as A, B and C, respectively. The particular construction and arrangement of these thermostat devices form no part of my present invention but merely illustrate one convenient and effective type of thermostat control apparatus. These thermostat control devices are all alike, each consisting of a galvanometer, the three galvanometers being designated $11^a$, $11^b$ and $11^c$ having a movable element which I shall designate on the respective galvanometers as $12^a$, $12^b$ and $12^c$, respectively operating in conjunction with contacts $13^a$ and $14^a$, $13^b$ and $14^b$, $13^c$ and $14^c$ respectively. Coöperating with the moving element and the contacts of each galvanometer is a reciprocating contact which I shall designate as $15^a$, $15^b$ and $15^c$, respectively. These contacts are moved into and out of engagement with the movable elements of the galvanometers by electric motors $16^a$, $16^b$ and $16^c$, respectively, acting through eccentrics $17^a$, $17^b$ and $17^c$ to slowly reciprocate their contacts. It will be seen, therefore, that while the reciprocating contacts do not actually engage the stationary contacts $13^a$, $13^b$, $14^a$, $14^b$, etc., they make contact with them through the movable elements of the galvanometers, since when the movable elements are deflected in either one direction or the other relative to a predetermined temperature, the end of the moving element of the galvanometer will be pinched between the reciprocating contact and the stationary contact, and electrical contact will thereby be established between the respective contacts.

The moving element $12^a$ of the thermostat device A is controlled by the temperature of the furnace charge through the agency of the thermocouple 18, which is in good thermal relation with the surface of the charge 3. This thermocouple is connected to the terminals of the galvanometer by conductors 19 so that a temperature change in the charge will cause the deflection of the movable element $12^a$. The galvanometer of the two thermostatic devices B and C are both controlled by thermocouple 20 which is in good thermal relation with the resistor. The temperature setting of these two thermostat devices is different, however, the contacts of the device B being set to a lower temperature than that of the thermostat device C. Assuming for the purpose of illustration, the temperatures above mentioned, the contacts of the thermostatic device B will be set so that movable element $12^b$ will be midway between $13^b$ and $14^b$ when the temperature of the resistor is 1540° F., between contacts $14^b$ and $15^b$ when the temperature of the resistor is above 1540° F., and between contacts $13^b$ and $15^b$ when the temperature of the resistor is below 1540° F. The contacts of the thermostat C, however, are set so that $12^c$ is between contacts $13^c$ and $14^c$ when the temperature of the resistor is 1800° F., and similarly between contacts $14^c$ and $15^c$ or $13^c$ and $15^c$ when the temperature is above or below 1800° F. A second relay 21 which is controlled by thermostat device A and which may be called the transfer relay, is identical with the relay 5 and provided with a winding 22 which moves its contact arm 23 into engagement with the contacts 24 and 25 which moves the contact arm into engagement with contacts 26.

As thus constructed and arranged, the operation of my device is as follows: If we assume for purposes of illustration, the temperature above referred to, namely: the temperature of the charge at 1500° F., the initial temperature of the resistor at 1800° F., and the lower working temperature of the resistor at 1540° F.; also assuming the charge cold or at least below 1500° F., the parts will be in the position shown in the drawing. The contact arms of the relays 5 and 21 will be in the right hand position shown, or if they are not in this position they will be immediately moved to these positions when power is applied to the lines 27, since the winding 25 of relay 21 will be energized through the movable element $12^a$ which is in its left hand position and when the relay 21 is moved to its right hand position the winding 9 of the relay 5 will be energized through the movable element $12^c$, which must be in its left hand position, and will move the contact element 6 into engagement with contacts 7.

Assuming, therefore, the parts in the position shown, when power is supplied to the line 27, the winding of the contactor 4 will be energized through the contacts 7 and the contactor will be closed to complete the circuit through the resistor. The furnace will now begin to heat up under the control of the thermostat device C. When the temperature of the resistor rises above 1800° F., the movable element $12^c$ will move to the right into engagement with contacts $14^c$ and $15^c$ and energize the winding 10, through the contacts 7, winding 10, conductor 30, contacts $14^c$ and $15^c$, conductor 31, contacts 26, and back to line, thereby opening the contactor 4 and shutting off power to the resistor. When the temperature drops below 1800° F., the movable element 12ᶜ will move to the left and will make contact between 13ᶜ and 15ᶜ and energize the winding 9 to move the contact arm 6 back so as to again energize the contactor 4 and restore power to the resistor. In this way the circuit of the resistor will be opened and closed so as to maintain the temperature of the resistor at approximately 1800° F.

In the meantime the charge 3 is being heated up and when its temperature reaches 1500° F., the galvanometer element 12ᵃ on the thermostatic device A will be moved to the right so as to energize the winding 22 of relay 21 and move the switch arm 23 into engagement with contacts 24. This shifts the control of the circuits of relay 5 from the thermostat device C to the thermostat device B, and as the temperature of the resistor is already above 1540° F., the movable element 12ᵇ is now in engagement with contacts 14ᵇ and 15ᵇ and, therefore, the circuit of contact 4 will be opened and the power cut off from the resistor.

It is well known that the temperature of the surface of the charge which is the temperature controlling the galvanometer 11ᵃ, will heat up more quickly than the interior of the charge and, therefore, when the power is shut off, the surface temperature will fall very quickly due to the absorption by the interior of heat from the surface. But as the temperature throughout the charge becomes more nearly uniform the rate of temperature change of the surface of the charge when the power is shut off, gradually becomes slower. When the surface of the charge drops below 1500° F., the relay 21 is restored to its original position, the control shifted back to thermostat device C and winding 9 of relay 5 energized to close the contactor and restore power to the resistor. In this way the circuit of the resistor will be opened and closed and the temperature of the resistor gradually decreased until the charge is completely saturated with heat, at which time only sufficient heat is required to compensate for the heat losses, and it is assumed that this can be maintained by running the resistor at a temperature of 1540° F.

When the temperature of the resistor drops below 1540° F., the element 12ᵇ completes the circuit to restore relay 5 to operate the contactor and restore the power, which is kept on until the temperature of the resistor is again brought above 1540° F.

It will be observed that the change in temperature of the resistor from 1800° F. to 1540° F. is gradual as the power is restored thereto a number of times, while the change is taking place, in order to keep the temperature of the charge at 1500° F.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with an electric furnace or the like, of a plurality of controlling devices for the heating element, each for maintaining the heating element at a different temperature, means responsive to the temperature of the heating element for controlling the said devices and means controlled by the temperature of the furnace charge for shifting the control from one device to the other.

2. The combination with an electric furnace or the like, of means controlled by the temperature of the heating element for maintaining the heating element at either of two predetermined temperatures, and means controlled responsively to the temperature of the furnace charge for governing the first mentioned means.

3. The combination with an electric furnace or the like, of means responsive to the temperature of the heating element for maintaining the temperature of the heating element at any one of a plurality of predetermined temperatures, and means responsive to the temperature of the furnace charge for automatically changing the temperature to be maintained by the first mentioned means.

4. The combination with an electric furnace or the like, of means for controlling the temperature thereof, comprising two controlling devices for maintaining the heating element at either of two different temperatures, means controlled responsively to the temperature of the heating element for controlling the said devices, and means controlled by the temperature of the furnace charge for automatically selecting the device which shall control the heating element.

5. The combination with an electric furnace or the like, of means controlled responsively to the temperature of the heating element for controlling the heating element, and means controlled responsively to the temperature of the furnace charge for controlling the heating element, whereby the heating element is maintained at a predetermined temperature until the furnace charge reaches a predetermined temperature and is thereafter automatically reduced to and maintained at a lower temperature.

6. The combination with an electric furnace or the like, of means whereby the heating element is maintained at a predetermined temperature until the charge reaches a predetermined temperature, and is thereafter automatically reduced to and maintained at a lower temperature while the charge is maintained at approximately its predetermined temperature.

7. The combination with an electric furnace or the like, of means controlled by the temperature of the heating element for controlling the energy input to said furnace, and means controlled by the temperature of the charge for controlling the temperature of the heating element.

8. The combination with an electric furnace or the like, of switch mechanism controlled by the temperature of the heating element for controlling the power circuit to the heating element, and means controlled by the temperature of the charge for controlling the temperature of the heating element.

9. The combination with an electric furnace or the like, of means for controlling the temperature thereof, comprising an electromagnetic switch for controlling the power circuit to the heating element, two temperature controlled devices for controlling said switch in response to different temperatures of the heating element, and means controlled by the temperature of the furnace charge for shifting the control of said switch from one device to the other.

10. The combination with an electric furnace or the like, of means for controlling the temperature thereof, comprising a relay for controlling the power circuit to the heating element, two temperature controlled devices for controlling said relay in response to different temperatures of the heating element, a second relay for shifting the control of said first mentioned relay from one device to the other, and means controlled by the temperature of the charge for controlling the operation of said second relay.

11. The combination with an electric furnace or the like, of means controlled by changes in temperature of the resistor relative to a predetermined temperature thereof, which will just compensate for the heat losses of the furnace after the charge has been heated through for maintaining the temperature of the charge constant.

12. The combination with an electric furnace or the like, of means operated responsively to the temperature of the heating element for varying the energy input to the furnace, and means operated responsively to the absorption of heat by the interior of the furnace charge from the surface of the charge for controlling the first mentioned means.

13. The combination with an electric furnace or the like, of means operated responsively to the absorption of heat by the interior of the furnace charge from the surface of the charge for decreasing the energy input of the furnace when the surface temperature of the charge has reached a predetermined maximum value and increasing the energy input of the furnace when the surface temperature of the charge then drops to a predetermined minimum value due to absorption of heat by the interior of the charge from the surface of the charge.

14. The combination with an electric furnace or the like, of means operated responsively to the temperature of the heating element for limiting the maximum temperature of the heating element to a predetermined value, and means operated responsively to the absorption of heat by the interior of the furnace charge from the surface of the charge for decreasing the energy input of the furnace when the interior of the charge has been heated to substantially the same temperature as the surface of the charge.

15. The combination with an electric furnace or the like, of means operated responsively to the temperature of the heating element for limiting the temperature of the heating element to a predetermined range of temperatures and means for gradually reducing the energy input of the furnace as the temperatures of the interior and of the surface of the furnace charge approach equalization at a lower predetermined temperature than the minimum temperature limit of the heating element.

16. The combination with an electric furnace or the like, of means for varying the energy input of the furnace to limit the surface temperature of the charge to a range of temperatures between a predetermined maximum value and a predetermined minimum value, and for gradually reducing the energy input of the furnace as the temperatures of the interior and of the surface of the charge approach equalization, at a predetermined value within the said range of temperatures.

17. The combination with an electric furnace or the like, of means including a temperature controlled device having a member in contact with the surface of the furnace charge for reducing the energy input of the furnace when the surface temperature of the charge rises to a predetermined value so that the interior of the charge may absorb heat from the surface of the charge, and for increasing the energy input of the furnace when the surface temperature of the charge then falls to another predetermined value due to absorption of heat by the interior of the charge from the surface of the charge.

18. The combination with an electric furnace or the like, of means comprising a temperature measuring device in contact with the surface of the charge for varying the temperature of the heating element so as to heat the charge throughout to a predetermined temperature and to limit the temperature of the surface of the charge from either exceeding a predetermined higher value or falling below a predetermined lower value.

In witness whereof, I have hereunto set my hand this 13th day of November, 1918.

EDGAR F. COLLINS.